United States Patent
Nakagawa

(10) Patent No.: US 6,577,464 B2
(45) Date of Patent: Jun. 10, 2003

(54) MAGNETIC RECORDING DEVICE HAVING FIRST ACTUATOR FOR COARSE ADJUSTMENT AND SECOND ACTUATOR FOR FINE ADJUSTMENT

(75) Inventor: Masayoshi Nakagawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 310 days.

(21) Appl. No.: 09/785,855

(22) Filed: Feb. 16, 2001

(65) Prior Publication Data

US 2001/0015866 A1 Aug. 23, 2001

(30) Foreign Application Priority Data

Feb. 22, 2000 (JP) ........................... 2000-044890

(51) Int. Cl.[7] .............................................. G11B 15/12
(52) U.S. Cl. ..................... 360/62; 360/63; 360/77.02; 360/78.04; 360/78.05
(58) Field of Search .................. 360/245.9, 245.8, 360/264.5, 264.2, 234.5, 78.05, 78.12, 77.02, 78.04, 75, 62, 63, 61

(56) References Cited

U.S. PATENT DOCUMENTS

| | | | |
|---|---|---|---|
| 5,189,578 A | * | 2/1993 | Mori et al. .............. 360/77.02 |
| 5,764,444 A | | 6/1998 | Imamura et al. |
| 5,898,544 A | | 4/1999 | Krinke et al. |
| 6,088,187 A | | 7/2000 | Takaishi |

* cited by examiner

Primary Examiner—Alan T. Faber
(74) Attorney, Agent, or Firm—Brinks Hofer Gilson & Lione

(57) ABSTRACT

In a magnetic recording device, a control element placed on a flexible wiring board between a control device and first actuators includes a plurality of actuator-driving-signal connecting terminals connected to a plurality of second actuators, an actuator-driving-signal input terminal to which driving voltage for the second actuators is input from the control device, connecting wires for connecting the actuator-driving-signal input terminal to the actuator-driving-signal connecting terminals, signal selection elements incorporated in the connecting wires, and a decoder for selecting one of the signal selection elements so that a specific actuator-driving-signal connecting terminal is connected to the actuator-driving-signal input terminal.

12 Claims, 6 Drawing Sheets

MAGNETIC RECORDING DEVICE HAVING FIRST ACTUATOR FOR COARSE ADJUSTMENT AND SECOND ACTUATOR FOR FINE ADJUSTMENT

BACKGROUND OF THE INVENTION

1. Field of the Invention

The present invention relates to a magnetic recording device having a magnetic head which reads and writes magnetic information while moving relative to a magnetic recording medium, and more particularly, relates to an improved magnetic recording device having a first actuator for coarsely adjusting the movement of a magnetic head relative to a magnetic recording medium, and a second actuator for finely adjusting the movement of the magnetic head.

2. Description of the Related Art

Conventionally, a magnetic recording device with a configuration shown in FIG. 5 is known as an information recording device for use in personal computers.

In a magnetic recording device M shown in FIG. 5, a plurality of disklike magnetic disks 100, which are coated with a magnetic film, are rotatably housed in a box-shaped chassis 101. Magnetic heads 102 are placed on the front or back sides of the magnetic disks 100 so as to move relative to the magnetic disks 100. Each of the magnetic heads 102 is supported by a base 105 via a load beam 103 shaped like an elongated triangular plate and an arm 104. The base 105 is movably supported in the chassis 101. That is, in the configuration shown in FIG. 5, the magnetic head 102 is moved relative to the magnetic disk 100 in the radial direction by movement of the base 105 so as to read out magnetic information recorded on a desired position of the magnetic disk 100 or to write magnetic information on a desired position of the magnetic disk 100.

Regarding the driving structure for the base 105 shown in FIG. 5, the base 105 is rotated on a rotating shaft 106 in parallel with the rotating shaft of the magnetic disk 100, and the magnetic head 102 is thereby moved in the radial direction above (or below) the magnetic disk 100. The base 105 may be driven in various ways, for example, by a driving structure using a voice coil motor or by a driving structure using a linear motor.

In the magnetic disk device M shown in FIG. 5, various signals, such as control signals for the magnetic heads 102, signals of magnetic information read by the magnetic heads 102, signals of magnetic information to be written on the magnetic disks 100 by the magnetic heads 102, and selection signals for the magnetic heads 102, must be exchanged between a main control device and the magnetic heads 102.

For this reason, conventionally, a main control device 107 disposed in the chassis 101 and the base 105 are connected by a flexible printed circuit board 108, and various wires are laid on the printed circuit board 108 so as to connect the main control device 107 and the magnetic heads 102.

FIG. 6 schematically shows the state in which the printed circuit board 108, connectors 109 of the main control device 107, and the magnetic heads 102 are connected.

In this example, two magnetic disks 100 are stacked one above the other, and magnetic heads 102 are placed on the upper and lower sides of the magnetic disks 100. Two connecting wires 111 are connected to each of the magnetic heads 102 and are routed onto the printed circuit board 108. The connecting wires 111 are connected to terminals 115 disposed on one side of a control element 112 placed on the printed circuit board 108. Terminals 116 on the other side of the control element 112 are connected to the connectors 109 of the main control device 107 via a plurality of connecting wires 113.

The connecting wires 111 connected to the four magnetic heads 102 are connected in order from the top to the terminals 115 which are also arranged on one side of the control element 112 in order from the top in FIG. 6, and are laid out so as not to intersect on the printed circuit board 108. The terminals 116 on the other side of the control element 112 are connected to the connector 109 of the main control device 107 via the connecting wires 113 which are laid in parallel so as not to intersect on the printed circuit board 108. In the terminals 115 shown in FIG. 6, Vcc represents a power input terminal, R/W represents a read/write mode switching terminal for the magnetic head 102, RD represents a read signal output terminal, HS0 and HS1 represent magnetic head selection terminals, WDI represents a write data input terminal, WUS represents a writing enable signal terminal, and GND represents a ground terminal.

With recent increases in recording density of magnetic disks, the width of tracks formed on the magnetic disks have been reduced year by year. Conventionally, the width of tracks (thin information writing areas formed on a magnetic disk in the circumferential direction) is set so that approximately forty thousand tracks can be formed per inch, for example, the track width has been reduced to approximately $0.5 \times 10^{-6}$ m. Therefore, if the track width is further reduced, it may be difficult for the magnetic head to precisely trace the tracks of such reduced width in the driving mechanism for the magnetic head utilizing rotation of the base 105, the driving mechanism utilizing a voice coil motor, or the linear driving mechanism. For example, it is thought that stability of the control system cannot respond to further reduction in track width in the existing driving mechanism for the magnetic head because of structural limitations of a bearing system.

Accordingly, attempts have been made to precisely and finely adjust the position of the magnetic head by providing a second actuator, which allows finer movement, in addition to the conventional driving mechanism. While various elements have been proposed as the second actuator, a piezoelectric actuator has attracted great attention as a promising driving element.

While the piezoelectric actuator is characterized in being capable of finely adjusting the position of the magnetic head by controlling current application thereto, when wires of the piezoelectric actuator are incorporated in the wiring structure shown in FIG. 6 and the control element 112, the number of wires is increased. This makes it difficult to lay the wires in parallel on the printed circuit board 108 so as not to intersect with one another.

While the voltage for controlling the magnetic head is usually approximately ±5 V or ±3.3 V, the control voltage for the piezoelectric actuator is approximately ±30V, which is high. Therefore, it is difficult to incorporate both a transistor for controlling the piezoelectric actuator and a transistor for controlling the magnetic head in the same control element 112, because this increases the withstand voltage of the transistor for the magnetic head.

When the wires of the piezoelectric actuator are laid on the printed circuit board 108 in addition to the wires of the magnetic head, the number of wires on the printed circuit board 108 is increased, and flexural rigidity of the printed circuit board 108 is also increased. The increase in flexural rigidity of the printed circuit board 108 increases the resistance when the base 105 shown in FIG. 5 rotates. As a result, when the position of the magnetic head 102 is finely adjusted corresponding to the fine tracks, the printed circuit board 108 having increased flexural rigidity hinders improvement of the tracking accuracy. Therefore, it is preferable that the number of wires on the printed circuit board 108 be as small as possible.

Although the problems of intersection of wires can be easily overcome by providing a jumper switch on the printed circuit board 108, this makes assembly and adjustment of the printed circuit board 108 more troublesome and decreases assembly efficiency and reliability.

SUMMARY OF THE INVENTION

The present invention has been made in view of the above-described circumstances, and an object of the invention is to provide a structure for a magnetic recording device having a first actuator for coarsely adjusting the position of a magnetic head relative to a magnetic disk and a second actuator for finely adjusting the position of the magnetic head, in which wires for the magnetic head and wires for the second actuator can be laid out in parallel on a flexible wiring board so that they do not intersect with one another.

In the present invention, it is possible to apply current only to a magnetic head and a second actuator necessary to be driven, of a plurality of magnetic heads and a plurality of actuators, and to prevent current from being applied to the other magnetic heads and the other second actuators. This reduces power consumption and prevents heat generation.

Another object of the present invention is to provide a structure for a magnetic recording device having a first actuator and a second actuator, in which flexural rigidity of a flexible wiring board is prevented from being increased by minimizing the number of wires laid thereon in order to limit increases in the load on a driving system for the magnetic head and to improve tracking accuracy.

In order to achieve the above objects, according to an aspect of the present invention, there is provided a magnetic recording device including: a plurality of magnetic heads for moving relative to a magnetic recording medium so as to read information from the magnetic recording medium; first actuators for moving the magnetic heads relative to the magnetic recording medium; second actuators disposed respectively corresponding to the magnetic heads so as to finely adjust the positions of the respective magnetic heads relative to the magnetic recording medium; a flexible wiring board having connecting wires for the first actuators and the second actuators thereon; and a control element disposed on the flexible wiring board and connected to the connecting wires, wherein the control element includes: a plurality of actuator-driving-signal connecting terminals respectively connected to the second actuators; an actuator-driving-signal input terminal to which driving voltage for the second actuators is input from a control device; a plurality of connecting wires for connecting the actuator-driving-signal connecting terminals to the actuator-driving-signal input terminal; signal selection elements respectively incorporated in the connecting wires; and a decoder for selecting one of the signal selection elements so as to connect a specific one of the actuator-driving-signal input terminals to the actuator-driving-signal input terminal.

Even in a case in which the number of wires laid on the flexible wiring board may be increased because of the structure including the first actuators for moving the magnetic heads and the second actuators for finely moving the magnetic heads and having a driving voltage different from that of the first actuators, the wires for the second actuators are switched by switching among the signal selection elements incorporated in the connecting wires for the actuator-driving-signal input terminals by the decoder, which allows a single driving signal input terminal to be commonly used for the second actuators and which reduces the number of wires. This minimizes increases in number of wires to be laid on the flexible wiring board. Therefore, it is possible to easily lay out the wires in parallel on the flexible wiring board and to simplify the wiring structure.

Preferably, the driving voltage for the second actuators is set to be higher than the driving voltage for the magnetic heads.

Preferably, the first actuators are used for coarse adjustment so as to move the magnetic heads in the direction of width of tracks on the magnetic recording medium with information recorded thereon, and the second actuators are used for fine adjustment so as to move the magnetic heads in the direction of width of the tracks. Preferably, the first actuators each include an arm, a load beam mounted at the leading end of the arm, and an elastic flexure mounted at the leading end of the load beam, sliders are disposed at the end of the flexures so as to have the magnetic heads therein, and the second actuators are placed between the arms and the flexures.

In the magnetic recording device having the first actuators for coarse adjustment and the second actuators for fine adjustment, the magnetic heads incorporated in the sliders may be each supported via the arm, the load beam, and the flexure, and the second actuator may be each placed between the arm and the flexure. This facilitates fine adjustment of the position of the magnetic heads.

Preferably, two or more head-driving-signal lines are laid on the flexible wiring board, head-driving-signal connecting terminals respectively connected to the head-driving-signal lines are disposed in the control element, the actuator-driving-signal connecting terminals are disposed adjacent to the head-driving-signal connecting terminals in the control element, and a plurality of terminal sets of the head-driving-signal connecting terminals for the magnetic heads and the actuator-driving-signal connecting terminals for the second actuators corresponding thereto are arranged in line in the control element.

When the head-driving-signal connecting terminals connected to the head-driving-signal lines and the actuator-driving-signal connecting terminals connected to the actuator-driving-signal lines are arranged in line adjacent to each other in the control element so as to form terminal sets, the head-driving-signal lines and the actuator-driving-signal lines can be easily arranged in parallel on the flexible wiring board.

Preferably, the head-driving-signal lines connected to the head-driving-signal connecting terminals and the actuator-driving-signal lines connected to the actuator-driving-signal connecting terminals are arranged in parallel on the flexible wiring board so as not to intersect with one another.

Since these signal lines are thus arranged in parallel on the flexible wiring board so as not to intersect, intersections of the lines are not formed, and noise due to the intersections will not occur. This eliminates the necessity for placing a jumper on the flexible wiring board and improves reliability of wiring on the flexible wiring board.

Preferably, the head-driving-signal connecting terminals and the actuator-driving-signal connecting terminals are repeatedly arranged in the same order on one side of the control element.

Such arrangement allows the wires to be more easily arranged in parallel on the flexible wiring board.

Preferably, the magnetic heads are merged magnetic heads each having a reading element for reading information from the magnetic recording medium and a writing element for writing information, and a plurality of the head-driving-signal lines are disposed for the reading element and a plurality of the head-driving-signal lines are disposed for the writing element.

Since the number of signal lines is increased in the merged magnetic head, it is more difficult to arrange the signal lines in parallel on the flexible wiring board. However, multiple wires can be arranged in parallel so as not to intersect by arranging the terminals in line in the control element, as described above.

Preferably, the magnetic heads are merged magnetic heads each having a reading element for reading information from the magnetic recording medium and a writing element for writing information, a plurality of the head-driving-signal lines are disposed for the reading element and a plurality of the head-driving-signal lines are disposed for the writing element, and the decoder disposed on the control element has a switching means for switching between transmission of read information from the reading element to the control device and transmission of written information from the control device to the writing element.

The switching means incorporated in the decoder switches between transmission of read information from the reading element to the control device and transmission of written information from the control device to the writing element, and selection of the second actuators is made under the control of the signal selection elements and the decoder. Therefore, both the selection of the second actuators and the driving of the reading element and the writing element can be controlled by the decoder. Even when the voltage for the signal systems of the reading element and the writing element and the driving control voltage for the second actuators are substantially different, both the actuators and the elements can be controlled by the single decoder without any trouble.

Preferably, the signal selection elements includes a photocoupler composed of a diode and a switching element.

Even when the voltage for the second actuator driving system is high, ±30 V, in contrast to the low voltage of ±3.3 V or ±5 V for the magnetic head driving system, since both the circuits thereof are electrically separated by the photocoupler, signal selection can be performed so that the circuits do not have any influence on each other.

Further objects, features, and advantages of the present invention will become apparent from the following description of the preferred embodiments with reference to the attached drawings.

DESCRIPTION OF THE PREFERRED EMBODIMENTS

While an embodiment of the present invention will be described below with reference to the attached drawings, the present invention is not limited to the embodiment.

Figure 1:
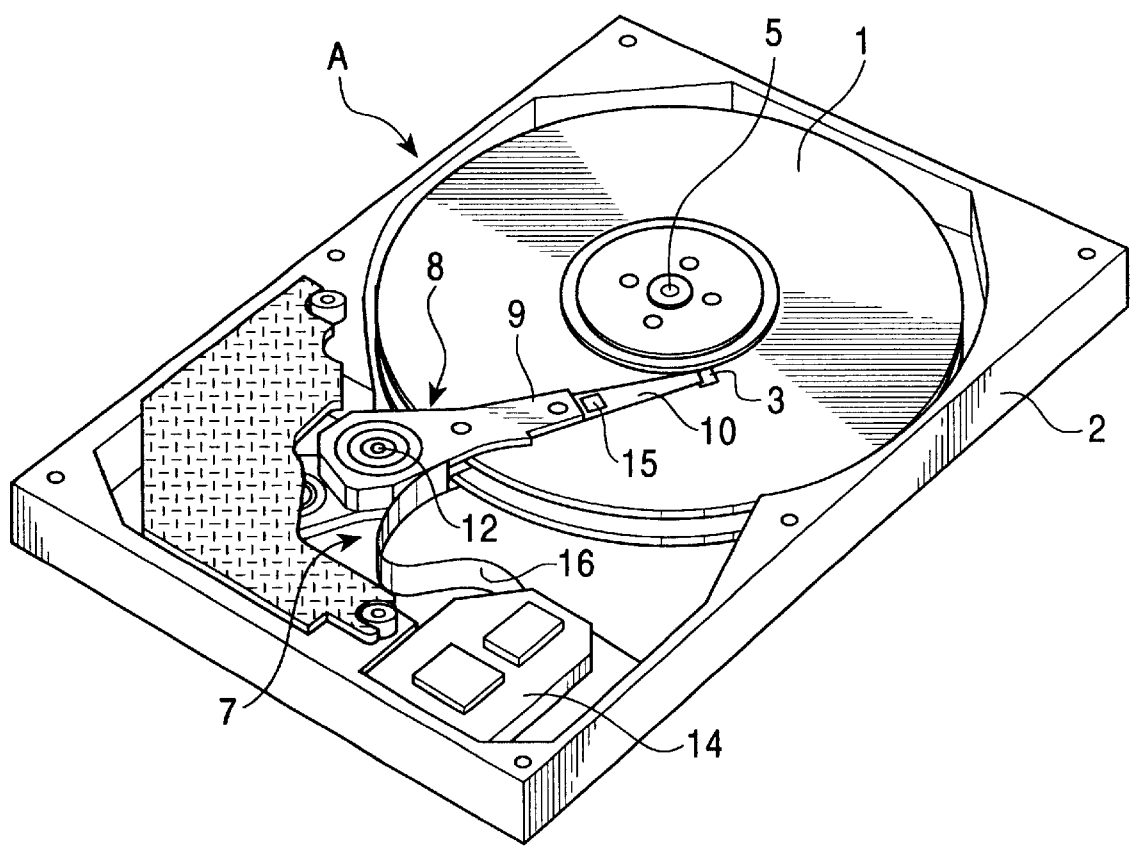
FIG. 1 is a structural view of a magnetic disk system having a magnetic recording device according to an embodiment of the present invention.
Figure 2:
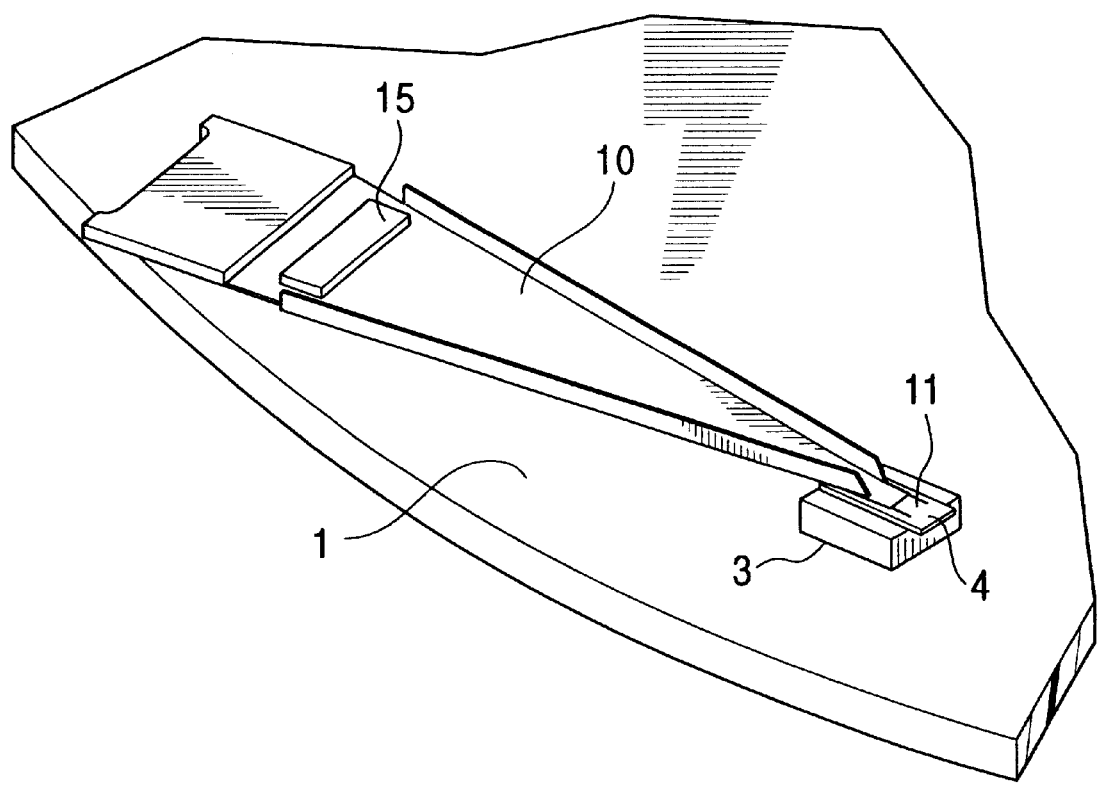
FIG. 2 is a perspective view showing a mounting state of a magnetic head in the embodiment of the present invention.

FIG. 1 shows a magnetic recording device A according to an embodiment of the present invention. In the magnetic recording device A of the embodiment, a plurality of (two in the figure) disklike magnetic recording media (magnetic disks) 1 are rotatably held in a box-shaped chassis 2, and a plurality of magnetic heads 3 are disposed inside the chassis 2 so as to move relative to the magnetic recording media 1 in the radial direction thereof. While the chassis 2 is, in actuality, hermetically sealed by placing a cover member (not shown) into close contact therewith on the upper side of the magnetic recording device A shown in FIG. 1, the cover member is not shown in FIG. 1 so that the inner structure of the magnetic recording device A is visible. The front and back surfaces of each of the magnetic recording media 1 are provided with magnetic layers, and multiple fine tracks are formed on the magnetic layers in the circumferential direction. Each of the magnetic heads 3 can move between target tracks in the radial direction of the magnetic recording medium 1.

In the chassis 2, the two magnetic recording media 1 are stacked one above the other with a predetermined clearance therebetween, and are rotatably supported on a rotating shaft 5 that penetrates the centers thereof. A flat spindle motor (not shown) is disposed at the bottom of the rotating shaft 5 so as to rotationally drive the magnetic recording media 1.

In the chassis 2, first actuators 8 having a voice coil motor 7 are disposed on the side of the magnetic recording media 1. Each of the first actuators 8 is provided with an arm 9, and a load beam 10 shaped like a tapered triangular plate is mounted at the leading end thereof. At the leading end of the load beam 10, a slider 4 with a magnetic head 3 therein is mounted via a flexure 11 shaped like a spring plate. The magnetic head 3 is driven so as to fly over the upper or lower surface of the magnetic recording medium 1 which is rotationally driven. A magnetic core 3a is embedded in a part of the surface of the slider 4 on the side of the magnetic recording medium 1.

The arm 9 is supported by a support shaft 12 penetrating the base end portion thereof so as to pivot along the plane direction (radial direction) of the magnetic recording medium 1. The voice coil motor 7 is composed of an annular coil (not shown) mounted at the rear end of the arm 9, and a permanent magnet (not shown) disposed therebelow and having south and north poles. The arm 9 is pivoted by a predetermined angle in the plane direction of the magnetic recording medium 1 by controlling the amount of current to be applied to the coil, thereby moving the magnetic head 3 to a predetermined position on the magnetic recording medium 1. In the above-described configuration, the voice coil motor 7, the support shaft 12, the arm 9, and the load beam 10 constitute the first actuator 8 for coarsely adjusting the position of the magnetic head 3.

In this embodiment, in order to more finely adjust the position of the magnetic head 3 than by the voice coil motors 7, second actuators (piezoelectric elements) 15 are disposed at the base ends of the load beams 10. By applying current to each second actuator 15, the position of the magnetic head 3 can be finely adjusted. Such use of the piezoelectric element as the second actuator 15 allows the position of the magnetic head 3 to be adjusted by, for example, approximately $\pm 0.1 \times 10^{-6}$ m.

In contrast, a flexible wiring board 16, such as a flexible printed circuit board, is disposed on the sides of the arms 9 so as to control application of current to the magnetic head 3. The flexible wiring board 16 is attached to the sides of the arms 9 on one side and is connected to a main control device 14 at the corner of the chassis 2 on the other side. The flexible wiring board 16 can be curved and moved with the movement of the arms 9. Wires to the magnetic heads 3 and wires to the second actuators 15 are arranged together on the flexible wiring board 16.

Figure 3:
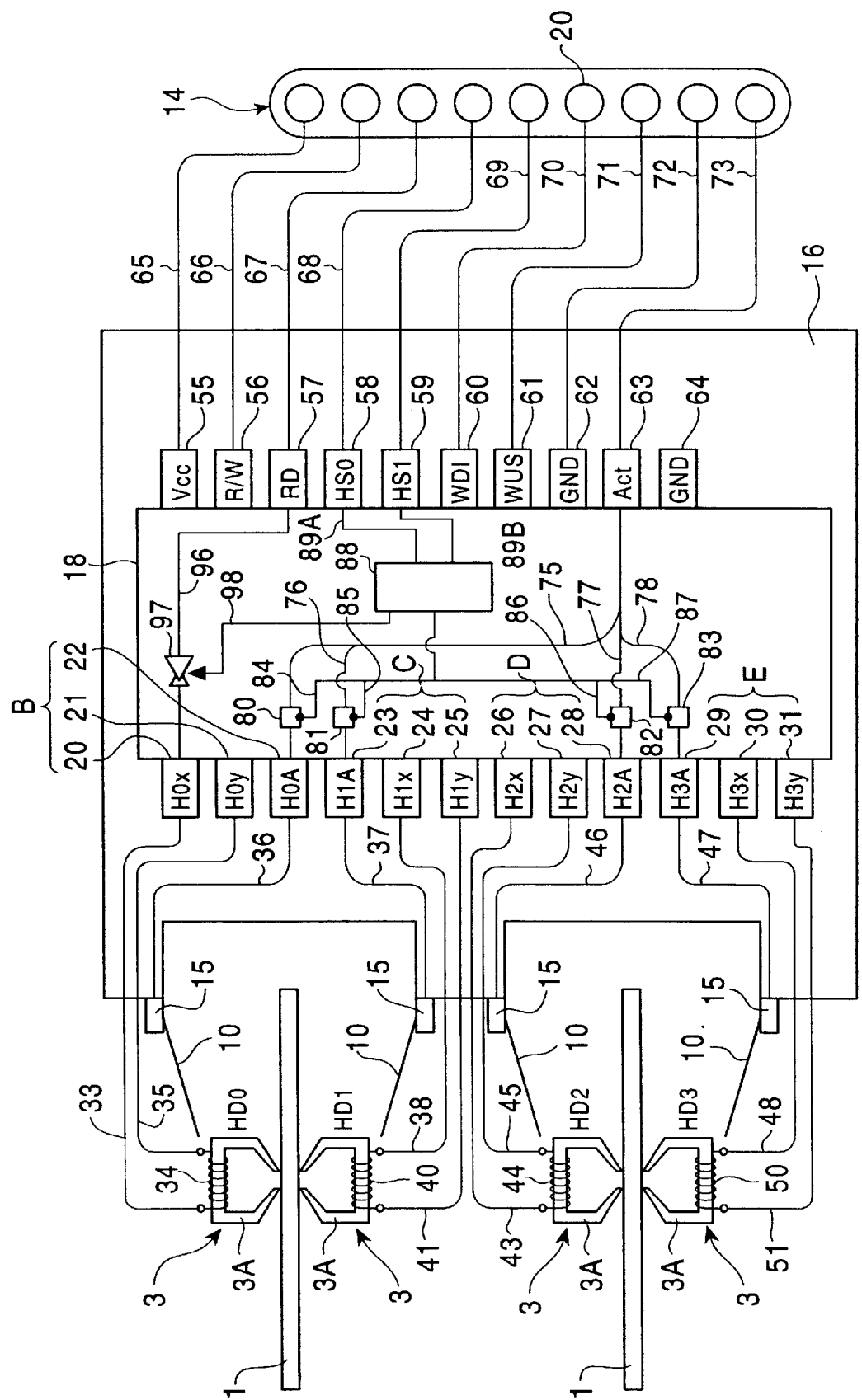
FIG. 3 is a schematic view showing the principal part of the magnetic recording device of the embodiment of the present invention.

FIG. 3 shows the layout of wires for the magnetic heads 3 and the second actuators 15 on the flexible wiring board 16.

A control element (control amplifier) 18 is mounted on the flexible wiring board 16. A column of terminals on one side of the control element 18 are electrically connected to the magnetic heads 3 and the second actuators 15, and a column of terminals on the other side of the control element 18 are electrically connected to connectors 20 of the main control device 14. In FIG. 3, only the parts forming the magnetic circuits in the magnetic heads 3 are simply shown as C-shaped cores 3A, the overall configuration of the magnetic heads 3 are simply shown, and the shapes of the second actuators 15 and the flexible wiring board 16 are also simply shown.

The terminals arranged in order from the top on one side of the control element 18 closer to the magnetic heads 3 (left side of the control element 18 in FIG. 3) are two head-driving-signal connecting terminals 20 and 21 for controlling application of current to the magnetic head 3 placed on the upper side of the upper magnetic recording medium 1 in FIG. 3, an actuator-driving-signal connecting terminal 22 for the first second actuator 15, an actuator-driving-signal connecting terminal 23 for the second second actuator 15, two head-driving-signal connecting terminals 24 and 25 for controlling application of current to the magnetic head 3 placed on the lower side of the upper magnetic recording medium 1, two head-driving-signal connecting terminals 26 and 27 for controlling application of current to the magnetic head 3 placed on the upper side of the lower magnetic recording medium 1, an actuator-driving-signal connecting terminal 28 for the third second actuator 15, an actuator-driving-signal connecting terminal 29 for the fourth second actuator 15, and two head-driving-signal connecting terminals 30 and 31 for controlling application of current to the magnetic head 3 placed on the lower side of the lower magnetic recording medium 1.

Among the above terminals, the two head-driving-signal connecting terminals 20 and 21 and the actuator-driving-signal connecting terminal 22 constitute a first terminal set B, the two head-driving-signal connecting terminals 24 and 25 and the actuator-driving-signal connecting terminal 23 constitute a second terminal set C, the two head-driving-signal connecting terminals 26 and 27 and the actuator-driving-signal connecting terminal 28 constitute a third terminal set D, and the two head-driving-signal connecting terminals 30 and 31 and the actuator-driving-signal connecting terminal 29 constitute a fourth terminal set E. That is, the column of terminals on the left side of the control element 18 are composed of a plurality of terminal sets of two head-driving-signal connecting terminals and an actuator-driving-signal connecting terminal which are arranged in order from the upper side in FIG. 3.

Referring to FIG. 3, the first head-driving-signal connecting terminal 20 is connected to one end of a coil 34 of the magnetic core 3A of the first magnetic head 3 via a first head-driving-signal line 33, the second head-driving-signal connecting terminal 21 is connected to the other end of the coil 34 via a second head-driving-signal line 35, and the first actuator-driving-signal connecting terminal 22 is connected to the first second actuator 15 via an actuator-driving-signal line 36.

Similarly, the second actuator-driving-signal connecting terminal 23 is connected to the second second actuator 15 via a second actuator-driving-signal line 37, the third head-driving-signal connecting terminal 24 is connected to one end of a coil 40 of the magnetic core 3A of the second magnetic head 3 via a third head-driving-signal line 38, and the fourth head-driving-signal connecting terminal 25 is connected to the other end of the coil 40 via a fourth head-driving-signal line 41.

Furthermore, the fifth head-driving-signal connecting terminal 26 is connected to one end of a coil 44 of the magnetic core 3A of the third magnetic head 3 via a fifth head-driving-signal line 43, the sixth head-driving-signal connecting terminal 27 is connected to the other end of the coil 44 via a sixth head-driving-signal line 45, and the third actuator-driving-signal connecting terminal 28 is connected to the third second actuator 15 via an actuator-driving-signal line 46.

Similarly, the fourth actuator-driving-signal connecting terminal 29 is connected to the fourth second actuator 15 via a fourth actuator-driving-signal line 47, the seventh head-driving-signal connecting terminal 30 is connected to one end of a coil 50 of the magnetic core 3A of the fourth magnetic head 3 via a seventh head-driving-signal line 48, and the eighth head-driving-signal connecting terminal 31 is connected to the other end of the coil 50 via an eighth head-driving-signal line 51.

On the other hand, the terminals arranged in order from the top on the right side of the control element 18 shown in FIG. 3 (the side of the control element 18 apart from the magnetic heads 3) are a power input terminal (Vcc) 55, a read/write mode switching terminal (R/W) 56, a read signal output terminal (RD) 57, head selection terminals (HS0 and HS1) 58 and 59, a write signal input terminal (WDI) 60, a writing unable signal terminal (WUS) 61, a ground terminal (GND) 62, a driving signal input terminal (Act) 63, and a driving signal ground terminal (GND) 64. These terminals 55 to 64 are electrically connected to the connectors 20 of the above-described main control device 14, respectively, via wires 65 to 73.

In the control element 18, connecting wires 75, 76, 77, and 78 are laid so as to connect the first actuator-driving-signal connecting terminal 22, the second actuator-driving-signal connecting terminal 23, the third actuator-driving-signal connecting terminal 28, and the fourth actuator-driving-signal connecting terminal 29 to the driving signal input terminal 63. The connecting wires 75, 76, 77, and 78 have signal selection elements 80, 81, 82, and 83 incorporated therein. The signal selection elements 80, 81, 82, and 83 are connected to a decoder 88 via connecting wires 84, 85, 86, and 87.

Figure 4:
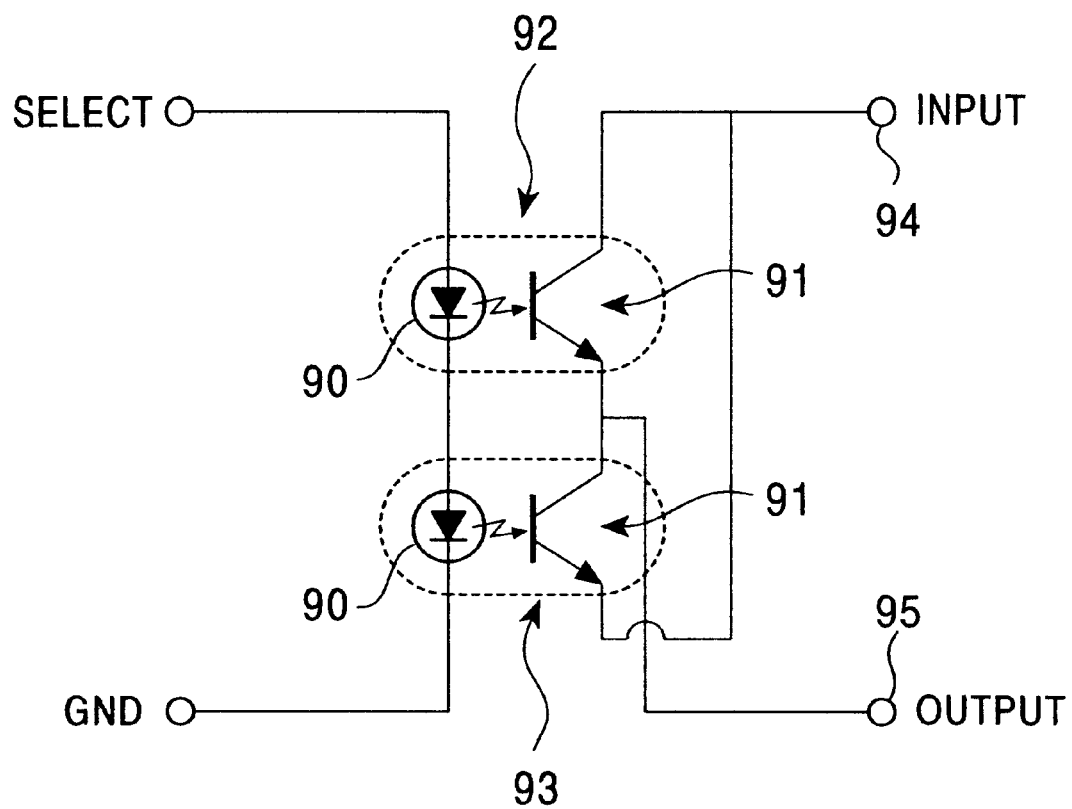
FIG. 4 is a circuit diagram showing the circuit configuration of a selection element in the magnetic recording device of the embodiment of the present invention.
Figure 5:
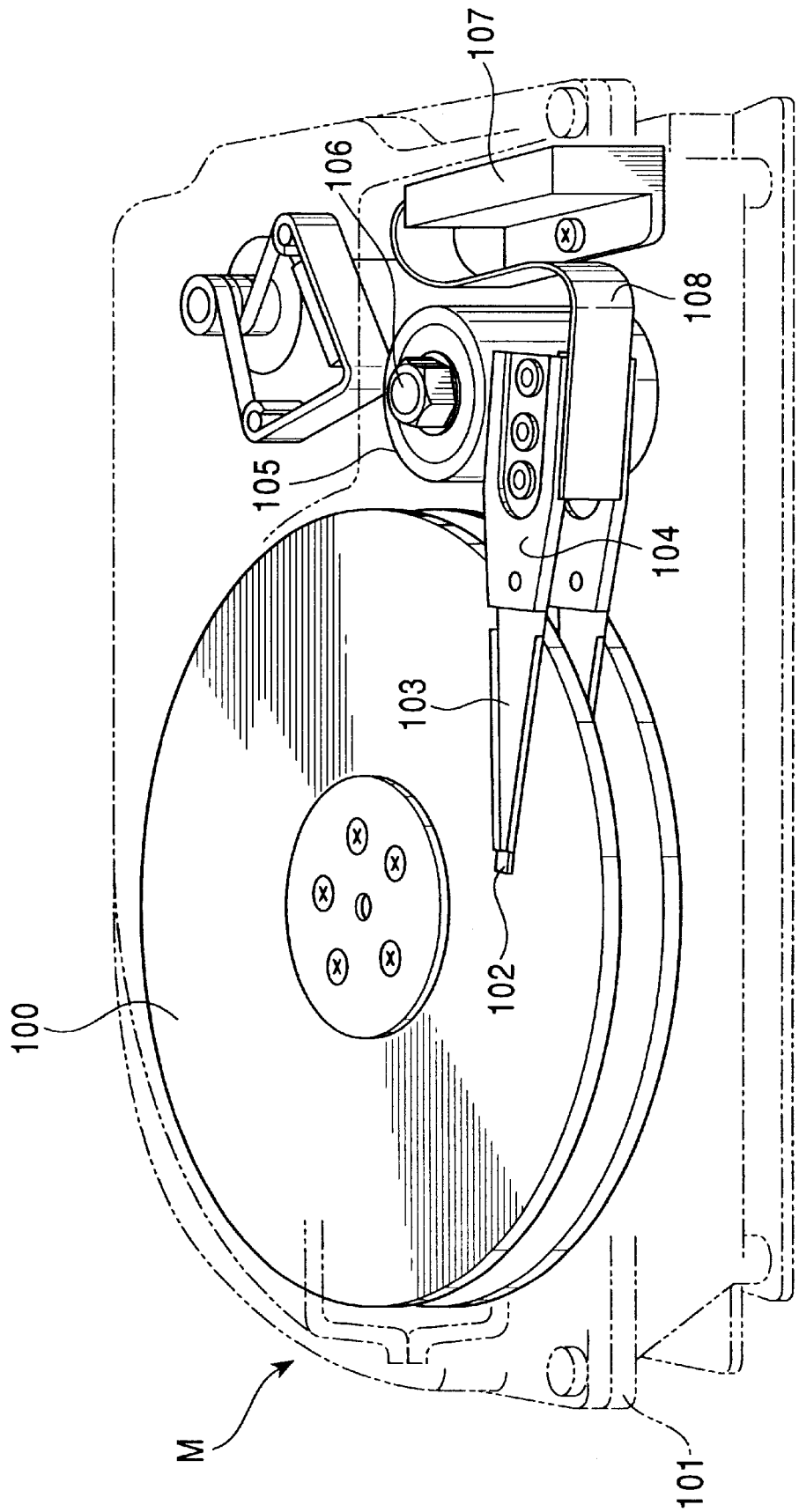
FIG. 5 is a structural view of a magnetic disk system having a conventional magnetic recording device.
Figure 6:
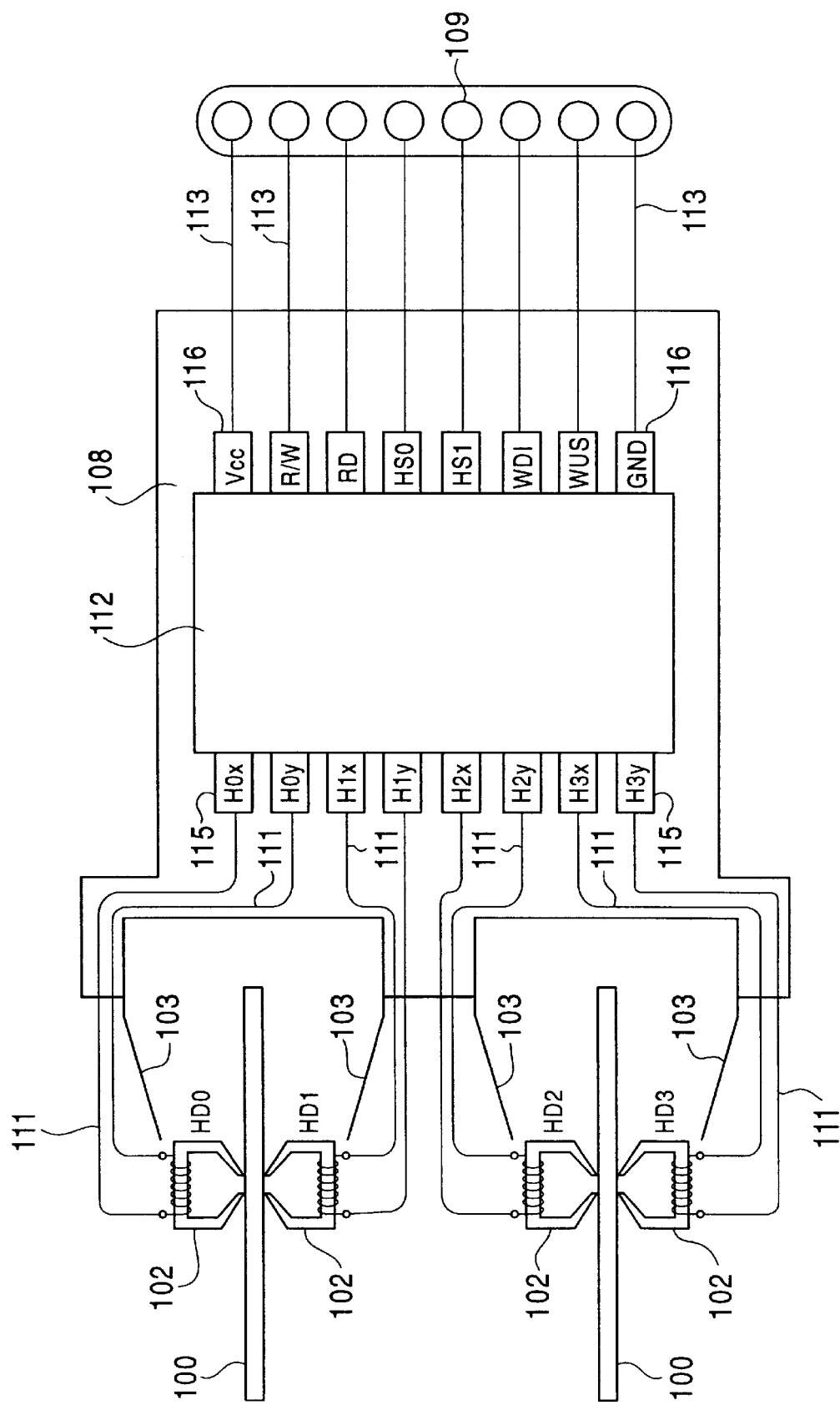
FIG. 6 is a schematic view showing the principal part of the conventional magnetic recording device.

For example, each of the signal selection elements 80, 81, 82, and 83 has photocouplers 92 and 93 composed of a diode 90 and a switching element 91, as shown in FIG. 4, and switches between application of a high voltage of approximately ±30 V input from an input terminal 94 to an output terminal 95 and interruption of the high voltage by inputting a switching signal of approximately ±3.3 V or approximately ±5 V from the decoder 88 to the diodes 90. The circuits of the signal selection elements 80, 81, 82, and 83 are made by connecting the output terminals 95 thereof to the second actuator-driving-signal connecting terminals 22, 23, 28, and 29.

According to the above-described configuration, in a case in which a high voltage of ±30V for driving the piezoelectric element is applied from the main control device 14 to the driving signal input terminal 63 and in which a selection signal of approximately ±3.3 V or approximately ±5 V is input from the decoder 88 to the power input terminal 55, the read/write mode switching terminal 56, the head selection terminals 58 and 59, the write signal input terminal 60, and the like, it is possible to separately lay out the connecting wires 75, 76, 77, and 78, to which a high voltage of ±30V is applied, and the other wires to which a signal of approximately ±3.3 V or approximately ±5 V is applied.

The decoder 88 is also connected to the head selection terminals 58 and 59 via connecting wires 89A and 89B. Any one of the first to fourth magnetic heads 3 shown in FIG. 3 can be selected and driven by switching between signals of the head selection terminals 58 and 59 as follows.

Referring to FIG. 3, connections between the decoder 88 and the first head-driving-signal connecting terminal 20, the second head-driving-signal connecting terminal 21, the third head-driving-signal connecting terminal 24, the fourth head-driving-signal connecting terminal 25, the fifth head-driving-signal connecting terminal 26, the sixth head-driving-signal connecting terminal 27, the seventh head-driving-signal connecting terminal 30, and the eighth head-driving-signal connecting terminal 31 can be switched by a wire switching structure (switching means), which is representatively shown for the first head-driving-signal connecting terminal 20, in order to switch among current application to the terminals 20 and 21, current application to the terminals 24 and 25, current application to the terminals 26 and 27, and current application to the terminals 30 and 31.

That is, the decoder 88 is connected to a switching element 97 incorporated in a wire 96 for connecting the first head-driving-signal connecting terminal 20 and the read signal output terminal 57, and connection or disconnection between the first head-driving-signal connecting terminal 20 and the read signal output terminal 57 is selected via the switching element 97 by a selection circuit incorporated in the decoder 88. While similar wire switching structures are formed by connecting the terminals 21, 24, 25, 26, 27, 30, and 31 connected to the four magnetic heads 3 to the read signal output terminal 57. they are not shown in FIG. 3 to simplify explanation. While similar wire switching structures (switching means) are also provided for the write signal input terminal (WD1) 60 and the writing unable signal terminal (WUS) 61 so that the magnetic heads 3 can perform reading and writing operations, they are also not shown to simplify explanation.

In the magnetic recording device A with the above-described configuration, the magnetic recording medium 1 is rotated by the spindle motor, the arm 9 is moved by a predetermined angle by the voice coil motor 7 so as to move the magnetic head 3 to a desired position, and current is applied to the coil 3A of the magnetic head 3 in the desired position, thereby writing magnetic signals on the magnetic film of the magnetic recording medium 1 or reading magnetic information recorded on the magnetic film by the coil 3A of the magnetic head 3.

In a case in which the magnetic recording medium 1 has magnetic tracks of a reduced width, since the magnetic head 3 cannot be precisely moved to a desired magnetic track on the magnetic recording medium 1 only by fine adjustment in which positioning is performed by moving the arm 9 by the voice coil motor 7, the position of the magnetic head 3 is finely adjusted by operating the second actuator 15.

In order to finely adjust the position of the magnetic head 3, in addition to coarse adjustment by the arm 9, any of the signal selection elements 80, 81, 82, and 83 is selectively operated by the decoder 88, and a driving signal of ±30V is applied from the driving signal input terminal 63 to the second actuator 15 of the magnetic head 3 to be used, thereby operating the second actuator 15 so as to finely adjust the position of the magnetic head 3. In this signal selection, the decoder 88 only selects any of the signal selection elements 80, 81, 82, and 83 corresponding to the second actuator 15, and a driving signal of ±30 V is applied from the actuator-driving-signal input terminal 63 to the selected actuator-driving-signal connecting terminal 22, 23, 28, or 29 via the connecting wire 75, 76, 77, or 78. Therefore, it is unnecessary to control switching to a high-voltage driving signal in the switching circuit in the decoder 88. For this reason, the inner circuit itself of the decoder 88 (inner semiconductor circuit itself) need not withstand high voltage, but may be driven only at low voltage. This eliminates the necessity of forming a special circuit configuration. The above-described application and interruption of high driving voltage are performed by the photocouplers 92 and 93 incorporated in any of the signal selection elements 80, 81, 82, and 83.

One of the four magnetic heads 3 shown in FIG. 3 to be used is selected by a selection signal from the head selection terminal (HS0 or HS1) 58 or 59. The head-driving-signal connecting terminals 20 and 21, the head-driving-signal connecting terminals 24 and 25, the head-driving-signal connecting terminals 26 and 27, or the head-driving-signal connecting terminals 29 and 30 are selected corresponding to the selected magnetic head 3, and data to be written is input from the write signal input terminal 60 to the magnetic coil of the selected magnetic head 3, or magnetic information is read by the magnetic coil of the selected magnetic head 3 and is output from the read signal output terminal 57, whereby magnetic information is written or read out.

As described above, in the magnetic recording device A of this embodiment, the flexible wiring board 16 is interposed between the main control device 14 for controlling driving signals for the magnetic heads 3 and the arms 9 of the first actuators 8 for moving the magnetic heads 3, and the movement of each magnetic head 3 is finely controlled by coarse movement of the arm 9 of the first actuator 8 and fine movement of the second actuator 15. Since the terminals 20 to 31 are arranged in order on the flexible wiring board 16, as shown in FIG. 3, the head-driving-signal lines 33 and 35, the actuator-driving-signal lines 36 and 37, the head-driving-signal lines 38, 41, 43, and 45, the actuator-driving-signal lines 46 and 47, and the head-driving-signal lines 48 and 51 can be laid out in parallel so that they do not intersect with one another. For this reason, it is unnecessary to provide a jumper or the like on the flexible wiring board 16. This improves assembly efficiency and reliability, compared with a structure including a jumper.

Since one of the four magnetic heads 3 is selected by the decoder 88 and current is applied only to the second actuator 15 corresponding to the selected magnetic head 3, it is possible to drive only the magnetic head 3 to be used and the second actuator 15 corresponding thereto without applying any current to the other magnetic heads 3 and the other second actuators 15. This makes it possible to reduce power for driving even in the structure in which the magnetic heads 3 are finely moved and to thereby reduce the total amount of power to be used in the magnetic recording device A. In contrast, if the magnetic head 3 unnecessary for recording and playback is driven and current is applied to the corresponding second actuator 15, power consumption is increased and undesirable heat generation occurs.

In the magnetic recording device in which the position of the magnetic head 3 is finely adjusted by the second actuator 15, the second actuators 15 for finely moving the four magnetic heads 3 are selectively driven, and voltage is selectively applied from the single driving signal input terminal 63. Since this makes the number of wires less than that in a case in which a driving signal input terminal is provided for each second actuator, the number of wires laid on the flexible wiring board 16 between the arms 9 for moving the magnetic heads 3 and the main control device 14 is minimized. This prevents flexural rigidity of the flexible wiring board 16 from being higher than necessary and prevents flexibility of the flexible wiring board 16 from being decreased. Therefore, there is no adverse effect on the tracking accuracy of the magnetic heads 3. As a result, the positions of the magnetic heads 3 can be precisely and finely adjusted by utilizing the second actuators 15.

While the above-described magnetic recording device A of this embodiment includes the two magnetic recording media 1 and the four magnetic heads 3, it may include an arbitrary number, which is one or more, of magnetic recording media and an arbitrary number, which is one or more, of magnetic heads. For example, three magnetic heads may be provided for two magnetic recording media, or three, four, five, or six magnetic heads may be provided for three magnetic recording media. The number of second actuators 15 is determined corresponding to the number of magnetic heads. Therefore, the number of actuator driving connecting terminals is determined corresponding to the number of the second actuators 15, and the number of signal selection elements is also determined corresponding thereto. Furthermore, the number of driving signal lines for each second actuator 15 is not limited to one, but may be two or more in accordance with the structure of the second actuator 15. In this case, the required number of driving signal lines are provided for each second actuator 15, and a number of actuator-driving-signal connecting terminals corresponding thereto are formed on the control element 18.

The number of the terminals disposed on the control element 18 is determined in accordance with the structure of the magnetic head to be used. The present invention is applicable to, for example, a merged magnetic head in which an inductive writing element and a magnetoresistive reading element are incorporated in a single magnetic head slider. In such a merged magnetic head, since two or more connecting wires must be connected to the inductive writing element and two or more connecting wires must be connected to the magnetoresistive reading element, at least four connecting wires are necessary to drive one magnetic head. Accordingly, in this case, four or more head-driving-signal connecting terminals must be provided for a single magnetic head on the control element 18.

In the configuration shown in FIG. 3, while the head-driving-signal connecting terminals are arranged in the order shown in the figure (arranged in the order are the head-driving-signal connecting terminals 20 and 21, the actuator-driving-signal connecting terminals 22 and 23, the head-driving-signal connecting terminals 24, 25, 26, and 27, the actuator-driving-signal connecting terminals 28 and 29, and the head-driving-signal connecting terminals 30 and 31), they may be arranged in the following order.

In another example of arrangement order, there may be arranged the head-driving-signal connecting terminals 20 and 21, the actuator-driving-signal connecting terminals 22 and 23, the head-driving-signal connecting terminals 25, 24, 26, and 27, the actuator-driving-signal connecting terminals 28 and 29, and the head-driving-signal connecting terminals 31 and 30. In this case, the terminals arranged on the upper side of the magnetic recording medium 1 and the terminals arranged on the lower side thereof are placed symmetrically. Such symmetrical arrangement of the terminals on one side of the control element 18 makes it possible to easily identify the terminals when manufacturing the control element 18 and to facilitate manufacturing and inspection of the control element 18.

The positions where the head-driving-signal connecting wires 33 and 35 and the actuator-driving-signal connecting wire 36 are connected to the end of the flexible wiring board 16 may be vertically inverted according to the vertical and horizontal positional relationship among the head-driving-signal connecting wires 33 and 35 led out of the magnetic head 3 and the actuator-driving-signal connecting wire 36 led out of the actuator 15. Therefore, the actuator-driving-signal connecting wire 36 may be placed at a higher position than those of the head-driving-signal connecting wires 33 and 35. In this case, all the terminals on the flexible wiring board 16 may be arranged from the top in the order, the actuator-driving-signal connecting terminal 22, the head-driving-signal connecting terminals 20 and 21, the head-driving-signal connecting terminals 24 and 25, the actuator-driving-signal connecting terminal 23, the actuator-driving-signal connecting terminal 28, the head-driving-signal connecting terminals 26 and 27, the head-driving-signal connecting terminals 30 and 31, and the actuator-driving-signal connecting terminal 29.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetic recording device comprising:
 a plurality of magnetic heads for moving relative to a magnetic recording medium so as to read information from said magnetic recording medium;
 first actuators for moving said magnetic heads relative to said magnetic recording medium;
 second actuators disposed respectively corresponding to said magnetic heads so as to finely adjust the positions of said respective magnetic heads relative to said magnetic recording medium; and
 a flexible wiring board having connecting wires for said first actuators and said second actuators thereon;
 a control element disposed on said flexible wiring board and connected to said connecting wires,
 wherein said control element comprises:
  a plurality of actuator-driving-signal connecting terminals respectively connected to said second actuators;
  an actuator-driving-signal input terminal to which driving voltage for said second actuators is input from a control device;

a plurality of connecting wires for connecting said actuator-driving-signal connecting terminals to said actuator-driving-signal input terminal;

signal selection elements respectively incorporated in said connecting wires; and a decoder for selecting one of said signal selection elements so as to connect specific one of said actuator-driving-signal input terminals to said actuator-driving-signal input terminal.

2. A magnetic recording device according to claim 1, wherein the driving voltage for said second actuators is set to be higher than the driving voltage for said magnetic heads.

3. A magnetic recording device according to claim 2, wherein said first actuators are used for coarse adjustment so as to move said magnetic heads in the direction of width of tracks on said magnetic recording medium with information recorded thereon, said second actuators are used for fine adjustment so as to move said magnetic heads in the direction of width of said tracks, said first actuators each include an arm, a load beam mounted at the leading end of said arm, and an elastic flexure mounted at the leading end of said load beam, sliders are disposed at the ends of said flexures so as to have said magnetic heads therein, and said second actuators are placed between said arms and said flexures.

4. A magnetic recording device according to claim 3, wherein two or more head-driving-signal lines are laid on said flexible wiring board, head-driving-signal connecting terminals respectively connected to said head-driving-signal lines are disposed in said control element, said actuator-driving-signal connecting terminals are disposed adjacent to said head-driving-signal connecting terminals in said control element, and a plurality of terminal sets of said head-driving-signal connecting terminals for said magnetic heads and said actuator-driving-signal connecting terminals for said second actuators corresponding thereto are arranged in line in said control element.

5. A magnetic recording device according to claim 4, wherein said head-driving-signal lines connected to said head-driving-signal connecting terminals and said actuator-driving-signal lines connected to said actuator-driving-signal connecting terminals are arranged in parallel on said flexible wiring board so as not to intersect with one another.

6. A magnetic recording device according to claim 5, wherein said head-driving-signal connecting terminals and said actuator-driving-signal connecting terminals are repeatedly arranged in the same order on one side of said control element.

7. A magnetic recording device according to claim 2, wherein two or more head-driving-signal lines are laid on said flexible wiring board, head-driving-signal connecting terminals respectively connected to said head-driving-signal lines are disposed in said control element, said actuator-driving-signal connecting terminals are disposed adjacent to said head-driving-signal connecting terminals in said control element, and a plurality of sets of said head-driving-signal connecting terminals for said magnetic heads and said actuator-driving-signal connecting terminals for said second actuators corresponding thereto are arranged in line in said control element.

8. A magnetic recording device according to claim 7, wherein said magnetic heads are merged magnetic heads each having a reading element for reading information from said magnetic recording medium and a writing element for writing information, and a plurality of said head-driving-signal lines are disposed for said reading element and a plurality of said head-driving-signal lines are disposed for said writing element.

9. A magnetic recording device according to claim 7, wherein said magnetic heads are merged magnetic heads each having a reading element for reading information from said magnetic recording medium and a writing element for writing information, a plurality of said head-driving-signal lines are disposed for said reading element and a plurality of said head-driving-signal lines are disposed for said writing element, and said decoder disposed on said control element has switching means for switching between transmission of read information from said reading element to said control device and transmission of written information from said control device to said writing element.

10. A magnetic recording device according to claim 1, wherein said first actuators are used for coarse adjustment so as to move said magnetic heads in the direction of width of tracks on said magnetic recording medium with information recorded thereon, said second actuators are used for fine adjustment so as to move said magnetic heads in the direction of width of said tracks, said first actuators each include an arm, a load beam mounted at the leading end of said arm, and an elastic flexure mounted at the leading end of said load beam, sliders are disposed at the ends of said flexures so as to have said magnetic heads therein, and said second actuators are placed between said arms and said flexures.

11. A magnetic recording device according to claim 1, wherein two or more head-driving-signal lines are laid on said flexible wiring board, head-driving-signal connecting terminals respectively connected to said head-driving-signal lines are disposed in said control element, said actuator-driving-signal connecting terminals are disposed adjacent to said head-driving-signal connecting terminals in said control element, and a plurality of terminal sets of said head-driving-signal connecting terminals for said magnetic heads and said actuator-driving-signal connecting terminals for said second actuators corresponding thereto are arranged in line in said control element.

12. A magnetic recording device according to claim 1, wherein said signal selection elements each include a photocoupler composed of a diode and a switching element.

* * * * *

UNITED STATES PATENT AND TRADEMARK OFFICE
CERTIFICATE OF CORRECTION

PATENT NO.   : 6,577,464 B2
DATED        : June 10, 2003
INVENTOR(S)  : Masayoshi Nakagawa It is certified that error appears in the above-identified patent and that said Letters Patent is hereby corrected as shown below:

<u>Title page,</u>
Item [56], References Cited, U.S. PATENT DOCUMENTS, delete "5,189,578 A" and substitute -- 5,189,578 B1 -- in its place.

Signed and Sealed this

Fourteenth Day of October, 2003

JAMES E. ROGAN
*Director of the United States Patent and Trademark Office*